Aug. 28, 1951     E. L. DANIELSON ET AL     2,565,803
METHOD OF BONDING THERMOPLASTIC MATERIALS
Filed May 17, 1949

INVENTORS
ELMER L. DANIELSON
FLOYD J. DOFSEN
BY
Munn, Liddy & Glaccum
ATTORNEYS

Patented Aug. 28, 1951

2,565,803

UNITED STATES PATENT OFFICE 2,565,803

METHOD OF BONDING THERMOPLASTIC MATERIALS

Elmer L. Danielson, Oakland, and Floyd J. Dofsen, San Francisco, Calif.

Application May 17, 1949, Serial No. 93,642

3 Claims. (Cl. 18—59)

The present invention relates to improvements in method of bonding thermoplastic material together. It embodies improvements over our copending application on "Process and Apparatus for Bonding Thermoplastic Materials," Serial No. 761,128, filed in the United States Patent Office on July 15, 1947, now Patent No. 2,492,973.

In the foregoing-mentioned copending application, we disclosed a method of bonding two thermoplastic materials together with a permanent bond therebetween. Briefly described, this earlier method consisted of precasting a thermoplastic part in one machine, applying a solvent thereto to soften the precast part just prior to injecting a second thermoplastic material against the softened surface, and utilizing another injecting machine for the second molding. This method required the operator of the second machine to accomplish the solvent-applying step immediately prior to the injection of the second thermoplastic material.

The new method provides a precast thermoplastic part, which is treated in such a manner that it is ready to receive the second injection or molding of thermoplastic material, without requiring the solvent-applying step on the part of the operator of the second machine.

Accordingly in our improved method, the precast thermoplastic parts may be made up in quantity and their surfaces treated well in advance. In other words, the precast parts may be stocked, and have been treated so that they are ready to receive the second injection or molding.

A further object of the present invention is to coat the precast thermoplastic part with a thermoplastic resin that will bond at a lower temperature than the second injected thermoplastic material. This thermoplastic resin acts as an insulator and prevents the precast part from being softened during the second injection. Thus, the outlines of the precast part are maintained.

Other objects and advantages will appear as the specification continues. The novel features of our invention will be set forth in the claims hereunto annexed.

For a better understanding of our invention, reference should be had to the accompanying drawing, forming part of this application, in which.

While we have shown only the preferred form of our invention, it should be understood that various changes, or modifications, may be made within the scope of the appended claims without departing from the spirit thereof.

Figure 5:
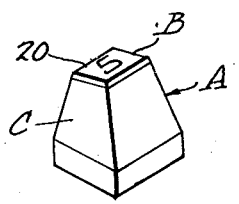
Figure 5 is an isometric view of the completed article of manufacture.

In order to illustrate one embodiment of our invention, we have chosen a calculator key cap indicated generally at A shown in Figure 5. Of course, we do not wish to be limited to this particular article. Broadly speaking, our invention relates to any article of manufacture made of two or more thermoplastic materials that are bonded permanently together.

The key cap A includes a face member or part B, which is precast in an injection molding machine; a key body or part C that is cast in a second injection molding machine. These machines have not been illustrated, since they are well-known in the art. However, the upper and lower coacting dies D and E, respectively, of the second injecting machine have been disclosed in Figure 3. It will be understood that these dies may be moved toward and away from one another.

Figure 1:
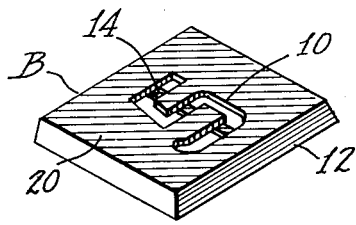
Figure 1 is an isometric view of a precast thermoplastic part, looking at the upper surface thereof, the precasting having been accomplished by an injection molding machine.
Figure 2:
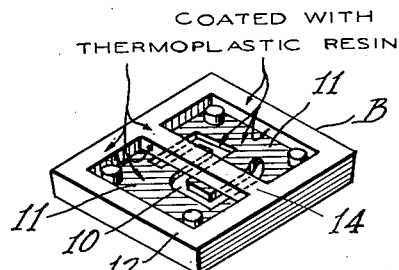
Figure 2 illustrates the underneath surface of this same precast part, the view being in isometric.

The precast part B has a character perforation 10 extending therethrough, which is formed during the casting or molding of this part from thermoplastic material. The character slot has been disclosed as forming the numeral "5"; but, of course, we do not desire to be limited to any particular character. The underneath surface of the part B (as seen in Figure 2) has recesses 11 formed therein, defining a flange 12 extending around the precast part. Also, the bar 14 is provided between the recesses 11 so as to extend across the character perforation.

Figure 3:
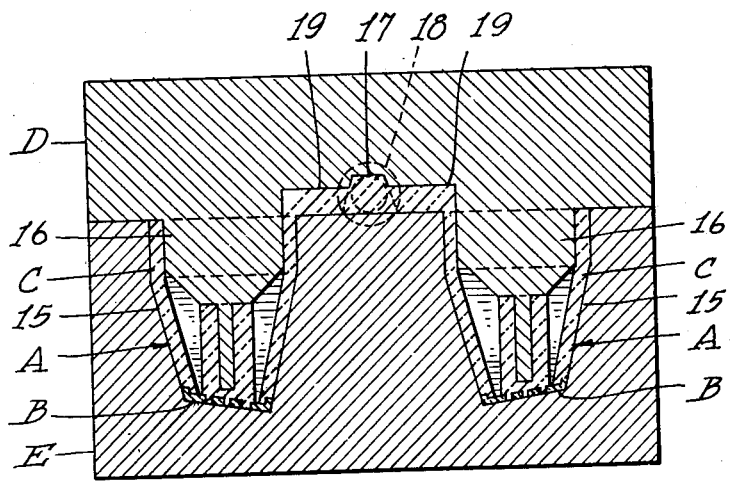
Figure 3 is a transverse vertical sectional view taken through the closed coacting dies of a second injection molding machine, and disclosing the completion of the second injection or molding.
Figure 4:
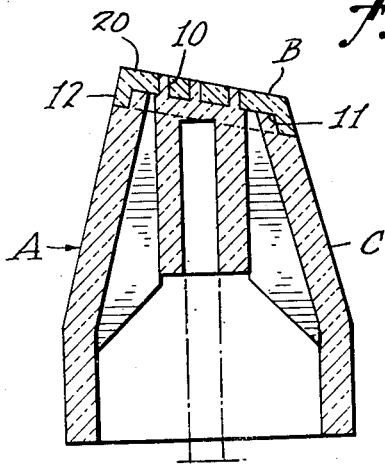
Figure 4 is an enlarged vertical sectional view taken through the completed article.

Referring now to Figure 3, it will be noted that the lower die E has a plurality of mold cavities 15 of a predetermined shape fashioned therein. The upper die D is provided with cores 16 of predetermined outlines, which project into the mold cavities when the dies are brought together. Further, the upper die has a main longitudinally-extending sprue-forming groove 17 on its underneath surface. This groove extends to one end of the die D so as to receive a delivery nozzle 18 of a conventional injection machine.

Branch sprue-forming grooves 19 are provided in the underneath surface of the upper die, which place the groove 17 in communication with the mold cavities 15 when the dies are closed, as in Figure 3.

After the precast part B has been made in a first injection machine, the entire underneath surface of this part is coated with a thermoplastic resin, as suggested by the legend in Figure 2. The thermoplastic resin used will bond at a lower temperature than the second injected thermoplastic material from which the part C is made. After the thermoplastic resin has been applied, it is allowed to set. The precast parts, after being treated with the thermoplastic resin and the latter set, may be stocked until they are required for completing the final calculator keys, or other articles of manufacture.

When the operator of the second injection machine is ready, the dies D and E are separated in order to expose the mold cavities 15. Subsequently, the precast parts B (coated with set thermoplastic resin) are inverted from their normal positions, and one precast part is dropped into each cavity 15 of the lower mold. In other words, the coated surfaces of the parts B will be uppermost at this time.

As the next step, the molds D and E are closed, and the delivery nozzle 18 is introduced into the groove 17 from one end of the closed dies. A second thermoplastic material, which may be of a contrasting color as compared with the precast part, is injected into the groove 17. This second thermoplastic material, which is under pressure, is forced through the main groove 17 and branch grooves 19 to the mold cavities 15.

Any space in the mold cavities 15 that is not occupied by the cores 16 will be filled with the incoming second thermoplastic material to form the bodies C. The latter is forced against the thermoplastic resin-coated surfaces of the precast part B. This will effect a permanent bond between the parts B and C.

The perforation 10 will be filled with the second thermoplastic material so that the character will be viewable from the normal upper surface 20 of the part B. In addition, the second material will flow around the bar 14 to provide a mechanical interlock between the parts B and C.

Although we have referred to a calculator key by way of example, we again point out that we do not wish to be limited in this respect. Also, the articles of manufacture could be made from more than two contrasting colors.

During the injection of the second thermoplastic material, the thermoplastic resin serves as an insulator over the precast part B and prevents softening of the latter. By way of example, the part B may be made from thermoplastic material that will soften at 350° F. The thermoplastic resin may soften at 250° F. However, a second thermoplastic material, at a temperature of 500° F. may be injected against the thermoplastic resin, and still the precast part B will not soften. This is due to the fact that the thermoplastic resin serves as an insulator between the two thermoplastic materials. As an alternative method, the thermoplastic resin could be placed on the precast part, or first shot, while the thermoplastic resin is hot. The thermoplastic resin is allowed to cool. As the heat leaves, the thermoplastic resin hardens. This thermoplastic resin will soften at a lower temperature than the second shot.

We claim:

1. In the herein described method of bonding thermoplastic materials together; the steps of: precasting a part from a first thermoplastic material; applying a coating of thermoplastic resin to the precast part and allowing the thermoplastic resin to set; and subsequently injecting a second heated thermoplastic material under pressure against the set thermoplastic resin on the precast part.

2. In the herein described method of bonding thermoplastic materials together; the steps of: precasting a part from a first thermoplastic material; applying a coating of thermoplastic resin to the precast part and allowing the thermoplastic resin to set; and subsequently injecting a second heated thermoplastic material under pressure against the set thermoplastic resin; the thermoplastic resin being characterized by the fact that its melting temperature is lower than that of the second thermoplastic material.

3. The herein described method of bonding thermoplastic materials together which comprises the steps of: precasting a part from a first thermoplastic material; applying a coating of thermoplastic resin to the surface of the precast part which is to be bonded to a second plastic, and allowing the coating to harden; and subsequently injecting a second heated thermoplastic material under pressure against the hardened coating for causing the coating to soften sfficiently for bonding the second plastic to the first when the materials cool; the coating acting as an insulating member for the precast part during the injecting of the second heated thermoplastic material for preventing the softening and any deforming of the surface of the precast part underlying the coating due to the heat and pressure of the second thermoplastic material during the injection thereof.

ELMER L. DANIELSON.
FLOYD J. DOFSEN.

REFERENCES CITED

The following references are of record in the file of this patent:

UNITED STATES PATENTS

| Number | Name | Date |
|---|---|---|
| 1,352,436 | Dickey | Sept. 14, 1920 |
| 1,565,532 | Tupper | Dec. 15, 1925 |
| 1,597,539 | Novotny | Aug. 24, 1926 |
| 1,668,590 | Hilfreich | May 8, 1928 |
| 2,285,963 | Gits | June 9, 1942 |